W. M. McFADDEN.
SELF ADJUSTING EQUINE SLING.
APPLICATION FILED JULY 28, 1913.

1,083,627.

Patented Jan. 6, 1914.
3 SHEETS—SHEET 2.

Witnesses:
Thos. Lagaard.
Robert W. Muir

Inventor:
William M. McFadden.
By F. A. Whiteley
his Attorney.

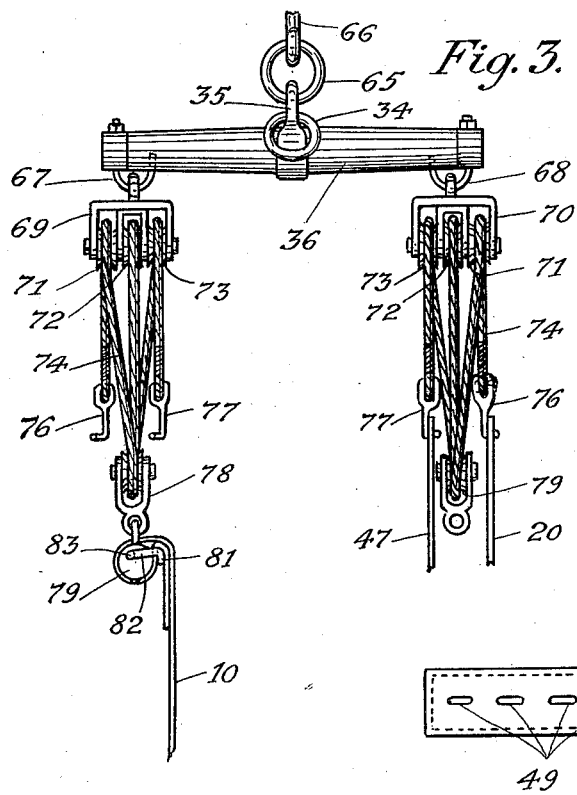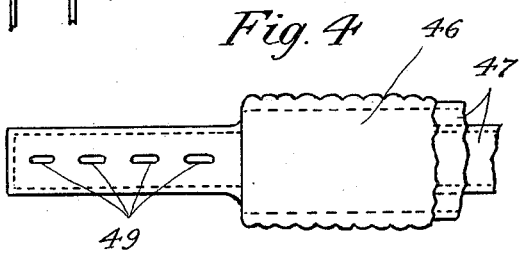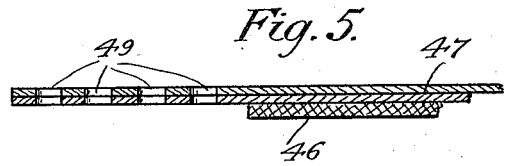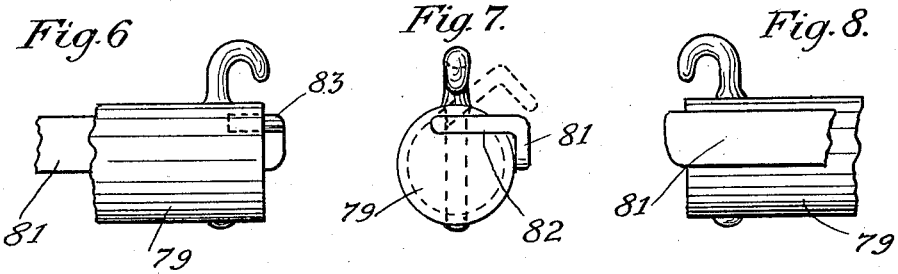

UNITED STATES PATENT OFFICE.

WILLIAM M. McFADDEN, OF LUCK, WISCONSIN.

SELF-ADJUSTING EQUINE SLING.

1,083,627. Specification of Letters Patent. Patented Jan. 6, 1914.

Application filed July 28, 1913. Serial No. 781,481.

*To all whom it may concern:*

Be it known that I, WILLIAM M. McFADDEN, a citizen of the United States, residing at Luck, in the county of Polk and State of Wisconsin, have invented certain new and useful Improvements in Self-Adjusting Equine Slings, of which the following is a specification.

My invention relates to equalizing slings for animals and has for its object to provide an absolutely balanced sling support whereby an animal who has been injured may be supported for a considerable period of time with or without the feet in position to touch the floor, as the conditions may require.

It is the object of my invention to provide a sling support for the above purpose which shall have contact points for the body of the animal such that the weight of the animal will be equally distributed upon portions of the animal's frame capable of supporting a weight, and those parts of the animal's frame which are not capable of receiving a weight will be protected.

It is also an object of my invention to provide means whereby the sling will automatically adjust itself to distribute the weight of the animal as above described.

It is also an object of my invention to provide means in connection with my sling support whereby the various parts thereof will be at all times held in proper position upon the animal.

The full objects and advantages of my invention will appear in connection with the detailed description thereof and are particularly pointed out in the claims.

Figure 1:
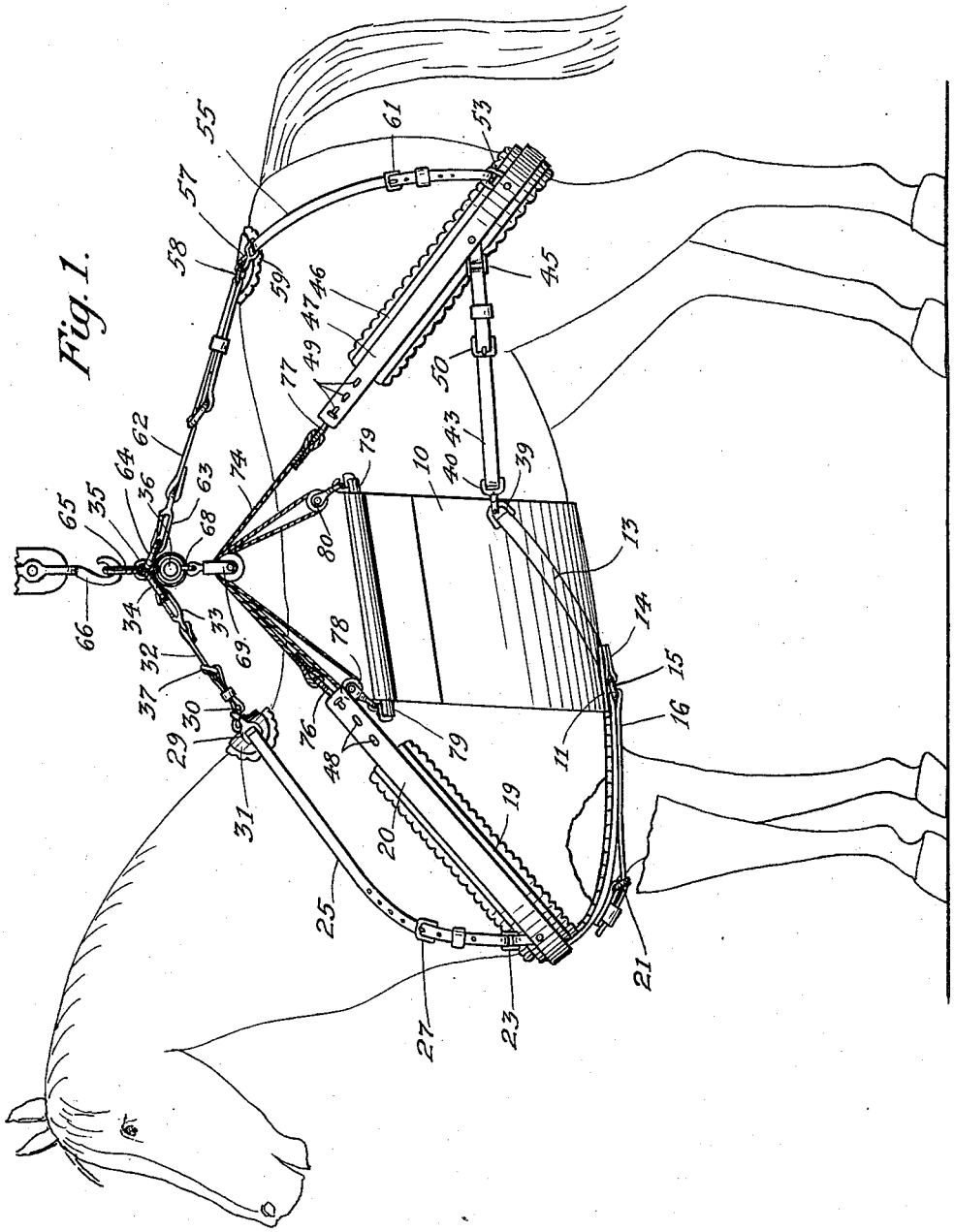
Figure 2:
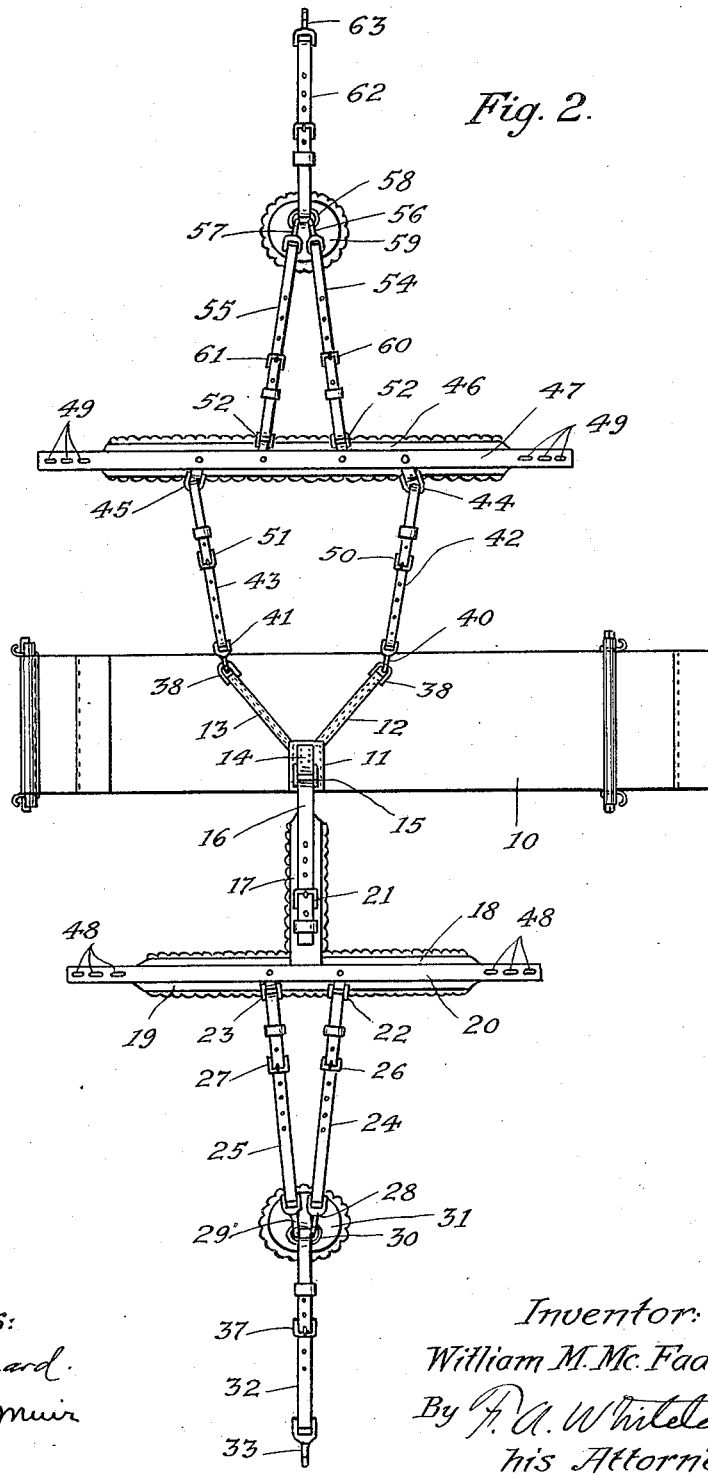

In the drawings, illustrating the application of my invention in one form,—Figure 1 is an elevation view of a suspending sling embodying the principle of my invention in position upon an animal. Fig. 2 is a plan view of the sling proper without the suspending and with all parts extended viewed from the underside of the sling as the same is positioned upon an animal. Fig. 3 is an end elevation of the suspending and equalizing means. Figs. 4 to 8, inclusive, are detail views.

As illustrated, the harness portion of the sling comprises a broad surcingle 10 to the central portion of which is sewed a leather base member 11, from which extend obliquely in both directions straps 12 and 13 also sewed to the surcingle 10. To the base member 11 is sewed a strap loop 14 carrying a metal retaining piece 15. One end of a strap 16 passes through the retaining loop 15, the other portion of said strap being secured to the leg 17 of a T-shaped breast-pad having arms 18 and 19 extending at right angles to the leg 17 and supported by a strap 20 secured to said arms. The free end of strap 16 passes through a buckle 21 secured to the portion of strap 16 fast on the leg 17 of the breast-pad, and by means of this buckle and the strap 16 the position of the portions 18 and 19 of the breast-pad relative to surcingle 10 may be adjusted. Retaining loops 22 and 23 are secured to portions 18 and 19, respectively, through which extend the looped ends of neck straps 24 and 25, said neck straps being adjustable for length by means of buckles 26 and 27. Snaps 28 and 29 are adapted to be engaged in a retaining loop 30 fast on a top pad 31, and a strap 32 has the looped end thereof passing through retaining loop 30 and is provided at its free end with a snap 33, by means of which the said strap may be secured to a ring 34 held within a clip 35 on a transverse supporting bar 36, the strap 32 being adjustable for the effective length by means of a buckle 37.

The rear oblique straps 12 and 13 are provided with retaining pieces 38 and 39 to which by means of snaps 40 and 41 are secured straps 42 and 43. The straps 42 and 43 are looped through retaining pieces 44 and 45 on a breech-pad 46, said breech-pad being reinforced by a double strap 47. The breech-pad 46 and the breast-pad 19 are similarly formed, as shown in detail in Figs. 4 and 5. The ends of these straps are provided with a series of eyelets 48 and 49, respectively, preferably of oblong shape, as shown in Figs. 4 and 5, by means of which the respective straps are attached to the supporting means as hereinafter pointed out. As shown in Fig. 1, the straps 42 and 43 are so connected with the breech-pad 46 that when the sling is adjusted to the animal the straps 43 and 44 will extend obliquely with respect to the breech-pad 46 and in a substantially horizontal direction along the belly and flank of the animal, the length of said straps being adjustable by means of buckles 50 and 51. The breech-pad 46 has secured to the strap 47 thereof, opposite from and nearer the center than the retaining pieces 44 and 45, a pair of retaining pieces 52 and 53 through which extend the looped ends of straps 54 and 55, said straps being connected by snaps 56 and 57 with a retaining loop 58 fast on a top pad 59 similar to top pad 31, the straps 54 and 55 being made adjustable for length by means of buckles 60 and 61. A strap 62 has the looped end thereof extending through retaining piece 58 and is adapted to be connected by means of a snap 63 with a ring 64 similar to ring 34 on clasp or clip 35 of supporting bar 36.

It will thus be seen that the surcingle 10, the compound breast-pad 17, 18, 19, and the breech-pad 46, together with the supporting straps connected therewith, are relatively adjustable so that the same can be made to fit perfectly and cling to the body of the animal and are at all times retained in operative position after being so fitted. For instance, the straps 42 and 43 prevent rising of the breech-pad 46 under movements of the animal's flanks, and the straps 54 and 55 complementally prevent said breech-pad from falling below the proper point of support. In the same manner the strap 16 holds the compound breast-pad at the proper point rearwardly to give balanced support under the sternum or breastbone and along the front flanks of the animal, while the straps 24 and 25 clasp the neck of the animal in suchwise as to prevent the breast supports from slipping too far rearwardly.

As already indicated, the primary support for the animal is the crossbar or equalizing bar 36 which is suspended by means of a ring 65 on the clasp 35 and a connection 66 extending to any desired tackle support. In addition to the rings 34 and 64 carried by member 35, as heretofore described, the equalizing bar 36 has freely suspended from holders 67 and 68 at the ends thereof a pair of sheave blocks 69 and 70, each having mounted therein three sheave wheels 71, 72 and 73, respectively. A cord 74 extends around the several wheels in each block 69 and 70 and is provided at its ends with fasteners 76 and 77 which engage within aperture 48 in breast strap 20 and aperture 49 in breech strap 47. The cord 74 passes from strap 20 or 47 over an outside sheave wheel 71 or 73, thence through a sheave wheel 78 at one end of a surcingle bar 79 secured to surcingle 10, as will be later pointed out. From the sheave wheel 79 the cord 74 passes over the central sheave wheel 72 and loops through a sheave wheel 80 on the other end of surcingle bar 79, from which cord 74 passes through the other outside sheave wheel 71 or 73 and connects at its end with the breech strap 47 or breast strap 48.

The surcingle 10 may be made of any pliable, flexible material of sufficient strength to stand the strain to be put upon it, such as leather, canvas or equivalent material, and passes freely around the surcingle bar 79 underneath a clamp bar 81 by which the surcingle when properly adjusted may be effectively clamped to the surcingle bar 79. The clamp bar 81, as best shown in Figs. 6 and 7, has arms 82 at the ends thereof provided with inwardly turned trunnions 83 extending into the ends of surcingle bar 79. By this means the clamp bar 81 is pivoted so as to lift up, as indicated in the dotted lines in Fig. 7, or to be brought down in engagement with surcingle 10 to hold the same in adjusted position. By this arrangement a given surcingle coming with the apparatus may be adjusted for length to suit a horse of any size.

It will be seen that the weight of the horse is supported entirely by the flexible supporting member 74 through the surcingle 10, the compound breast supports 17, 18, 19 and the breech support 46. By the arrangement of sheave wheels above described the weight of the horse will be perfectly equalized in this sling and properly distributed as it should be to the breastbone or sternum, front flanks, rear flanks and the thoracic wall of the animal, the limbs will be entirely free to be moved at will and yet the animal can at any time sustain its entire weight upon the supporting members of the sling, which, as above pointed out, are continuously restrained from getting out of operative position.

The sling is adjustable to fit any sized animal of the kind to which it is adapted to be applied.

The high utility and efficiency of my improved sling will, it is believed, be obvious.

I claim:

1. An equine sling comprising a surcingle, a breech-band, a breast-band, a supporting crossbar, and a single flexible member connecting the ends of the crossbar with the correspondingly positioned ends of the surcingle, the breech-band and the breast-band.

2. An equine sling comprising a surcingle, a breech-band, a breast-band, a supporting crossbar, and a single flexible member connecting the ends of the crossbar with the correspondingly positioned ends of the surcingle, the breech-band and the breast-band, each of said flexible members running over a system of sheave wheels whereby the strains upon the sircingle, breast-band and breech-band are equalized.

3. An equine sling comprising a surcingle, a breech-band, a breast-band, a supporting crossbar, a sheave block at each end of said supporting crossbar, a sheave wheel on each end of the surcingle, and flexible members having the ends thereof secured to the ends of the breast-band and breech-band and running over the sheave wheels and through the sheave wheel on the surcingle whereby the strains upon the surcingle, breast-band and breech-band are equalized.

4. An equine sling comprising a surcingle, a breech-band, a breast-band, a supporting crossbar, a sheave block at each end of said supporting crossbar, a pair of sheave wheels connected at the opposite edges of each end of the surcingle, and flexible members having the ends thereof secured to the ends of the breast-band and breech-band and running over the crossbar sheave wheels and through the sheave wheels on the surcingle whereby the strains upon the surcingle, breast-band and breech-band are equalized.

5. An equine sling comprising a surcingle, a breech-band, a breast-band, a supporting crossbar, a sheave block and three sheave wheels therein at each end of the supporting bar, a pair of sheave wheels connected at separated points to the respective ends of the surcingle and flexible members for each set of sheave wheels, each of said flexible members being connected at its ends with the breast-band and breech-band, respectively, and running from said points of connection over the outside sheave wheels on the sheave blocks and in loops about the sheave wheels on the surcingle and over the center sheave wheel of the sheave block.

6. An equine sling comprising a surcingle, a breech-band, a breast-band, said breast-band consisting of a portion extending from adjacent the center of the surcingle between the forelegs of the animal and a portion extending on each side of the front flanks of the animal, a strap for adjustably holding the center portion in relative position with respect to the surcingle, a pair of straps engaging over the base of the neck of the animal for holding the breast-band in properly lifted position, and means for equalizingly supporting all parts of said sling.

7. An equine sling comprising a surcingle, a breech-band, a breast-band, a surcingle bar connected to each end of the surcingle, a sheave wheel on each end of each surcingle bar, a supporting crossbar, a plurality of sheave wheels upon the ends of said supporting crossbar, and flexible members having the ends thereof secured to the ends of the breast-band and breech-band and running over the crossbar sheave wheels and through the sheave wheels on the surcingle whereby the strains upon the surcingle, breast-band and breech-band are equalized.

8. An equine sling comprising a surcingle, a breech-band, a breast-band, a surcingle bar, means for adjustably connecting the ends of the surcingle with said surcingle bar, a sheave wheel on each end of each surcingle bar, a supporting crossbar, a plurality of sheave wheels upon the ends of said supporting crossbar, and flexible members having the ends thereof secured to the ends of the breast-band and breech-band and running over the crossbar sheave wheels and through the sheave wheels on the surcingle whereby the strains upon the surcingle, breast-band and breech-band are equalized.

In testimony whereof I affix my signature in presence of two witnesses.

WILLIAM M. McFADDEN.

Witnesses:
  C. G. SHERER,
  R. E. SHERER.

---

Copies of this patent may be obtained for five cents each, by addressing the "Commissioner of Patents, Washington, D. C."